United States Patent [19]
Ottersbach et al.

[11] Patent Number: 6,001,894
[45] Date of Patent: Dec. 14, 1999

[54] PROCESS FOR MODIFYING THE SURFACE OF POLYMER SUBSTRATES BY GRAFT POLYMERIZATION

[75] Inventors: Peter Ottersbach, Windeck; Martina Inhester, Herten, both of Germany

[73] Assignee: Huels Aktiengesellschaft, Marl, Germany

[21] Appl. No.: 09/059,372

[22] Filed: Apr. 14, 1998

[30] Foreign Application Priority Data

| Apr. 14, 1997 | [DE] | Germany | 197 15 449 |
| Jul. 29, 1997 | [DE] | Germany | 197 32 586 |
| Dec. 9, 1997 | [DE] | Germany | 197 54 565 |

[51] Int. Cl.$^6$ .................................................. C08J 3/28
[52] U.S. Cl. ........................ 522/149; 522/33; 522/40; 522/36; 522/121; 522/114; 427/520; 427/521; 523/63; 523/71
[58] Field of Search .................... 522/120, 121, 522/114, 149, 33, 36, 40; 427/520, 521; 523/407, 423; 524/68; 525/63, 71

[56] References Cited

U.S. PATENT DOCUMENTS

| 4,129,617 | 12/1978 | Machi et al. ............................ 522/120 |
| 4,189,364 | 2/1980 | Aelion et al. . | |
| 4,196,065 | 4/1980 | Gaussens et al. ....................... 522/123 |
| 4,256,782 | 3/1981 | Tazuke et al. .......................... 427/520 |
| 4,311,573 | 1/1982 | Mayhan et al. . | |
| 4,407,846 | 10/1983 | Machi et al. ............................ 427/35 |
| 4,534,996 | 8/1985 | Rembaum et al. ...................... 427/44 |
| 4,589,964 | 5/1986 | Mayhan et al. . | |
| 4,761,436 | 8/1988 | Kohno et al. ........................... 522/114 |
| 4,927,890 | 5/1990 | Hsiue et al. ............................. 525/301 |
| 5,051,312 | 9/1991 | Allmer .................................... 428/458 |
| 5,612,931 | 3/1997 | Chabrecek et al. ..................... 523/106 |
| 5,855,623 | 1/1999 | English et al. .......................... 8/115.56 |
| 5,869,127 | 2/1999 | Zhong .................................... 427/2.12 |
| 5,885,566 | 3/1999 | Goldberg .............................. 424/78.18 |

FOREIGN PATENT DOCUMENTS

| 0 378 511 | 7/1990 | European Pat. Off. . |
| 0 574 352 | 12/1993 | European Pat. Off. . |

OTHER PUBLICATIONS

H.G. Elias In Makromolekule vol. 1 (1990) 572 ff.
Z.P. Yao and B. Ranby, Journal of Applied Polymer Science, vol. 40, 1647–1661 (1990).
H. Kubota et al., II. Journal of Polymer Science: Polymer Letters Edition, vol. 20, 17–21 (1982).
Journal of Polymer Science: Polymer Letters Edition, vol. 19, 457–462 (1981).
S. Tazuke et al., ACS Symp. Ser. 121, 217–241 (1980).
Arthur, Jr. J. C., Dev. Polymer Photochem. 2 (1982) 39.
K. Allmer et al., in J. Polym. Sc., Part A, vol. 26, 2099–2111 (1988).
Beyer•Walter, Lehrbuch der Organischen Chemie, S. Hirzel Verlag Stuttgart (1988), pp. 261–265.
Gerstenberg, K.W., Coating 9 (1994) 324 and Coating 10 (1994) 355.
Ruckert et al. Surface Modification of Polymers—III. Photoinitiated Grafting of Water soluble Vinyl Monomers and Influence of Fibrinogen Adsorption> Eur. Polym. J. vol. 31, No. 5. pp. 431–435 (1995).

*Primary Examiner*—James J. Seidleck
*Assistant Examiner*—Sanza L. McClendon
*Attorney, Agent, or Firm*—Oblon, Spivak, McClelland, Maier & Neustadt, P.C.

[57] ABSTRACT

A process for modifying the surface of a polymer substrate which comprises (1) pretreating the polymer substrate with a photoinitiator or thermoinitiator and at least one ethylenically unsaturated monomer, and (2) subjecting said pretreated polymer substrate to graft polymerization by said at least one monomer, optionally in the added presence of at least one ethylenically unsaturated monomer that is the same or different from the monomer of step (1), and products produced thereby.

19 Claims, No Drawings

PROCESS FOR MODIFYING THE SURFACE OF POLYMER SUBSTRATES BY GRAFT POLYMERIZATION

BACKGROUND OF THE INVENTION

1. Field of the Invention

The invention relates to a process for modifying the surface of polymer substrates by controlled graft polymerization, initiated by means of electromagnetic radiation or thermally, of ethylenically unsaturated compounds. The invention further relates to a method of using the modified polymer substrates for the production of products and to the products themselves.

2. Description of the Related Art

The modification of the surfaces of plastics, specifically of products used in industry, is of great commercial interest. The graft polymerization of ethylenically unsaturated monomers, in particular, has proven industrially and commercially significant, since by this means it is possible to find new applications for standard plastics already established in the market. Through the changes in the surfaces of the plastics it is possible to produce, in an efficient and cost-effective manner, products with interface properties optimized for the specific application. These changed properties can give, inter alla, hydrophilicized, dirt-repellent, printable and flame-retardant surfaces, and surfaces with increased solvent resistance. An overview of the varied possibilities for changing the properties of synthetic polymers by photoinitiated grafting is given by Arthur, Jr. J. C. in Dev. Polymer Photochem. 2 (1982) 39.

Various processes are known for modifying the surfaces of polymers by graft polymerizations. The grafting reaction is generally preceded by an activation of the relevant surface, i.e., either before the actual grafting or simultaneously with it, reactive centers are created on the surface of the substrate which serve as starting points for the actual polymerization as the reaction proceeds. This activation of the surface can be carried out, for example, by gamma radiation, ultraviolet radiation with wavelengths below 180 nm, plasma treatment, ozone treatment, electrical discharges, flame treatment, macroinitiators or photoinitiators.

U.S. Pat. No. 4,189,364 discloses that polymer surfaces can be modified by immersion in a solution of 2-hydroxyethyl methacrylate and dimethacrylate and irradiation with a $^{60}$Co source to create a new surface with significantly better water absorption. A disadvantage of this method is that it requires the availability of a $^{60}$Co source, with its associated complexity and cost. Furthermore, the type of radiation emitted from this source is non-specific and its effect is not restricted to the surface of the substrate to be modified, so that undesirable changes in the mechanical and chemical properties of the bulk of the polymer are caused.

The activation of a surface using ultraviolet radiation of a wavelength below 180 nm requires that, during the activation phase, oxygen is largely excluded, since it has a very strong absorption at the abovementioned wavelength. Since, on the other hand, activation by this method, which is ultimately based on the formation of oxidized reactive sites, requires at least a certain partial pressure of oxygen, it is very difficult to achieve a reproducible activation step in the context of an industrial process. In this connection, the continuous decrease in intensity of the relevant irradiation tubes also creates great problems. Besides this, an undesired change in the bulk properties of the substrate, caused by the irradiation, cannot be avoided, since highenergy radiation of this type can also break carbon-carbon bonds.

A plasma pretreatment, as described in EP 0 574 352, is likewise a method which proceeds under reduced pressure and which in practice reduces the process to a batch process, i.e., makes it extremely difficult to conduct the process continuously. Furthermore, this requires correspondingly complicated equipment, and in addition the activation is difficult to reproduce, because of the wide variety of independent plasma parameters.

The ozonization of a polymer surface to form oxidized reaction centers, as described, for example, in U.S. Pat. No. 4,311,573, U.S. Pat. No. 4,589,964 or EP 0 378 511, can only be carried out using particular protective measures, because of the toxicologically hazardous and fugitive character of ozone. For quality assurance in an industrial process, complicated control mechanisms are required for the reproducible setting of the relevant ozone concentrations, in order to ensure the consistent quality of the product produced.

Electrical discharges, as employed, for example, in the context of a corona treatment for surface activation, are generally, because of the specific requirements of the method, applicable only to substrates having a simple shape and a large surface, for example to film webs or extruded profiles. Similar considerations apply also to the flame treatment of polymers, and in this case the more severe thermal stress in particular at exposed locations of the substrate is an additional factor. A comparison of both methods, with possible and actual applications, is given, for example, by Gerstenberg, K. W. in Coating 9 (1994) 324 and Coating 10 (1994) 355.

Other ways of creating activated surfaces are provided by the application of initiator molecules, such as macroinitiators or photoinitiators.

The effect of macroinitiators is based on the application of preformed polymers having reactive groups onto the substrate to be modified. The bonding to the substrate in this case is purely physical. The actual grafting is initiated by a thermal or photochemical excitation of the relevant reactive groups of the macroinitiator. On the one hand, this method requires the synthesis of macroinitiators, which are frequently not commercially available, and on the other hand it is not always possible to ensure the permanent physical bonding of the macroinitiator to the respective substrate, even under the influence of solvents and temperature variation.

The use of photoinitiators for grafting is essentially based on a chain transfer and is universally applicable. Here, initiator radicals or polymer radicals abstract, for example, hydrogen atoms or chlorine atoms from the respective substrate and form macro radicals which initiate the graft polymerization of the added monomers. As described by H. G. Elias in Makromolekule Vol. 1 (1990) 572 ff. the achievable graft yield here is, however, very low, because of the low transfer constants of polymer radicals.

The grafting of HDPE, LDPE and polystyrene with acrylic acid and benzophenone as photoinitiator in the gas phase, described by K. Allmer et al., in J. Polym. Sc., Part A, 26, 2099–2111 (1988) is such a process with low transfer constants. It is, furthermore, unsuitable for monomers, such as sodium styrenesulfonate, which cannot be transferred into the gas phase. The method of S. Tazuke et al., described in ACS Symp. Ser. 121, 217–241 (1980), in which the polymer substrate is dipped in a solution containing the photoinitiator and the monomer and irradiated, is one of the processes in which no pretreatment of the substrate to promote grafting takes place and which therefore shows low transfer constants.

In contrast, according to H. Kubota et al., (I. J. Polym. Sc.: Polym. Ed. Lett., 19, 457–462 (1981)), PP and LDPE films are pretreated with a solution containing the photoinitiator, specifically benzophenone or anthraquinone or benzoyl peroxide, and polyvinyl acetate as carrier for the photoinitiator. By this means, the photoinitiator was physically linked to the substrate surface after removal of the solvent, namely acetone or chloroform. Methyl methacrylate, in the gas phase, and acrylic acid and methacrylic acid, in the liquid phase, were grafted onto the pretreated substrate surfaces with high yields. H. Kubota et al. in II. J. Polym. Sc.: Polym. Ed. Lett., 20, 17–21 (1982), investigated the influence of different solvents on the gas phase grafting of the monomers onto the substrate surfaces pretreated as described. A disadvantage of this process is the additional use of a film-forming agent, specifically polyvinyl acetate, as carrier for the photoinitiator. On the one hand, it is not possible without difficulty to distribute the photoinitiator with the desired homogeneity in the film-forming agent, and on the other hand it is unavoidable that the film-forming agent is also grafted onto the substrate, as a result of which the uniformity of the coating is impaired. Finally, the monomer is not only grafted onto the substrate to be modified, but also, unavoidably, onto the film-forming agent, and in the extreme case, depending on the graftability of the respective substrate, virtually exclusively onto the film-forming agent.

Z. P. Yao and B. Ranby have described a continuous process in which acrylamide or acrylic acid is grafted onto HDPE films (J. Appl. Pol Sci., 40 1647 (1990)), and for which the film is passed through a solution of monomer and benzophenone as photoinitiator in acetone as solvent ("presoaking") and irradiated. In the case of acrylamide, sublimating acrylamide vapor was also involved in the radiation-initiated grafting. The process is suitable for the coating of flat products, such as films. Preparatory modification of an irregularly shaped substrate surface is not possible. A further disadvantage is that the time for the "presoaking" and the irradiation time are rigidly linked, since the process operates continuously. A further disadvantage is that no temperature control of the "presoaking" solution is provided. The process is inflexible and lacks a number of important degrees of freedom. An optimal balance of the parameters which are decisive for success, specifically the concentration of initiator, monomer and solvent, the temperature of the solution and the duration of the "presoaking" and of the irradiation, is not possible.

SUMMARY OF THE INVENTION

The object of the present invention is to develop a process for modifying polymer surfaces of any desired form, by a controlled graft polymerization with any desired ethylenically unsaturated monomers, which is technically simple and as cost-effective as possible, and which does not have the disadvantages of the processes described.

According to the invention, this object has been achieved by means of a process for modifying the surface of polymer substrates using graft polymerization (grafting) of at least one ethylenically unsaturated monomer initiated by electromagnetic radiation or thermally, in which process the polymer substrate is pretreated, prior to the grafting, with a photoinitiator or a thermoinitiator and at least one ethylenically unsaturated monomer, which may be the same or different from the monomer employed in the graft polymerization.

DETAILED DESCRIPTION OF THE INVENTION

In one embodiment of the process of the invention, the grafting is carried out immediately, i.e. without further measures, after the pretreatment. In this case, only the monomer employed for the pretreatment or the monomer mixture employed for the pretreatment is thus graftpolymerized (variant A). In another embodiment, at least one further monomer, which can be identical or different from the monomer employed for the pretreatment, is applied to the pretreated polymer substrate, and the monomer employed for the pretreatment and the monomer applied subsequently are then graftpolymerized together (variant B)

The invention furthermore relates to the use of the polymer substrates modified in accordance with the invention for the production of medical products or hygiene products, and to the medical products and hygiene products themselves.

The novel process has a remarkable combination of advantages. With any desired monomers on substrates of very different chemical types, uniform and impermeable coatings with excellent resistance to environmental influences including solvents and abrasive forces are achieved. No complicated vacuum equipment is required for this. The photochemically initiated (radiation-initiated) graft polymerization enables, under otherwise identical conditions, shorter irradiation times than does graft polymerization without pretreatment. Furthermore, suitable choice of the photoinitiator enables the activation energy of the photochemically initiated polymerization to be matched to the particular polymer substrate, so that undesired changes in the mechanical or chemical properties of the substrate are avoided. The polymer surfaces to be modified using the novel process do not need to have any special topography: three-dimensional objects are just as suitable as flat surfaces. This is particularly advantageous in the post-modification of objects which have already been produced. A particular advantage of the thermally initiated graft polymerization of the invention is that thermal initiation of grafting, for example by means of infra-red rays or microwaves, is cheaper than initiation by means of UV rays in the preferred range from 200 to 400 nm and in addition also reaches zones which are inaccessible to UV rays, for example in the interior of shaped cavities. In particular in the case of initiation of the graft polymerization by microwave radiation, even extremely small shaped cavities, such as the interior lumen of tubes, for example blood tubes or catheters, can be modified efficiently and economically.

The polymeric substrates whose surfaces are modified according to the invention include homo- and copolymers, for example polyolefins, such as polyethylene (HDPE and LDPE), polypropylene, polyisobutylene, polybutadiene, polyisoprene, natural rubbers and polyethylene-co-propylene; halogen-containing polymers, such as polyvinyl chloride, polyvinylidene chloride, polychloroprene and polytetrafluoroethylene; polymers and copolymers of vinylaromatic monomers, such as polystyrene, polyvinyl toluene, polystyreneco-vinyl-toluene, polystyrene-co-acrylonitrile, polystyrene-co-butadiene-co-acrylonitrile; polycondensates, for example polyesters, such as polyethylene terephthalate and polybutylene terephthalate; polyamides, such as poly-caprolactam, polylaurinlactam and the polycondensate from hexamethylenediamine and adipic acid; polyetherblockamides, for example from laurinlactam and polyethylene glycol having on average 8, 12 or 16 ethyleneoxy groups; also polyurethanes, polyethers, polycarbonates, polysulfones, polyether ketones, polyester amides and imides, polyacrylonitrile and polyacrylates and methacrylates. Blends of two or more polymers or copolymers may also be surface-modified by the novel process, as may combinations of different polymers connected to one another by adhesion, welding or fusing, including the interfaces.

Monomers of many varying types which have at least one olefinic double bond, even those which can be transferred into the gas phase only with difficulty, or not at all, are suitable for the process. The type of their functional groups determines in which manner the surfaces of the polymer substrates become modified, e.g. hydrophilic, hydrophobic, solvent-resistant, dirt-repellent, bacteria-repellent, cell-proliferation-inhibiting, etc. The monomers can, as mentioned, be used in two phases of the novel process firstly in the pretreatment of the polymer substrate and, if desired, additionally after the pretreatment and before the graft polymerization. The following explanations refer to the monomers for both phases.

Examples of suitable monoolefin monomers are acrylic or methacrylic compounds of the general formula $$CH_2=CR^1—COOR^2 \qquad (I),$$

acrylamides and methacrylamides of the general formula $$CH_2=CR^1—CONR^2R^3 \qquad (II),$$

vinyl compounds of the general formulae $$R^4CH=CHR^5 \qquad (III),$$

and derivatives of maleic and fumaric acid of the general formula $$R^4OOC—C=C—COOR^4 \qquad (IV),$$

where $R^1$ is a hydrogen atom or a methyl group; $R^2$, $R^3$ and $R^4$ are identical or different and are each a hydrogen atom, a metal atom or a branched or unbranched aliphatic, cycloaliphatic, heterocyclic or aromatic hydrocarbon radical having up to 20 carbon atoms or such a hydrocarbon radical containing carboxyl groups, carboxylate groups, sulfonate groups, alkylamino groups, alkoxy groups, halogens, hydroxyl groups, amino groups, dialkylamino groups, phosphate groups, phosphonate groups, sulfate groups, carboxamido groups, sulfonamido groups, phosphonamido groups or combinations of these groups; and $R^5$ is a hydrogen atom, a methyl group, a nitrile group, or a hydroxyl group, or is the same as $R^4$ or is an ether group of the formula —$OR^4$, in which $R^4$ is as defined above.

Preferred monomers of the formulae I to IV for the novel process are monomers containing carboxyl or carboxylate groups, in particular (meth)acrylic acid, maleic acid and their corresponding derivatives, monomers containing sulfonate groups, monomers containing hydroxyl groups, monomers containing amino or ammonium groups and monomers containing phosphate groups.

Other suitable monomers for use in the novel process are those which have two olefinic double bonds and are of the general formula $$CH_2=CR^1—R^6—CR^1=CH_2 \qquad (V)$$

where $R^6$ is a bivalent organic radical and $R^1$ is as stated. They are preferably employed together with monoethylenically unsaturated monomers, expediently in amounts of from 0.5 to 10 mol percent, based on the monoolefinic monomers, giving crosslinked graft copolymers.

Examples of suitable monoethylenically unsaturated monomers I to IV are: (meth)acrylic acid, methyl (meth)acrylate, ethyl (meth)acrylate, butyl (meth)acrylate, 2-ethylhexyl (meth)acrylate, tert-butylaminoethyl (meth)acrylate, 2-hydroxyethyl (meth)acrylate, 4-hydroxybutyl (meth)acrylate, (meth)acrylamide, (meth)acrylonitrile, vinylsulfonic acid, vinylphosphonic acid, styrenesulfonic acid, sodium vinylsulfonate, sodium styrenesulfonate, sodium vinylphosphonate, sodium vinylstyrenesulfonate, tert-butylaminoethyl methacrylate, dimethylaminoethyl methacrylate, diethylaminoethyl methacrylate, dimethylaminoneopentyl acrylate, maleic acid, maleic anhydride, diethyl maleate, maleimide, fumaric acid and dimethyl fumarate.

Examples of suitable diolefinic monomers V are, inter alia, 1,4-butanediol di(meth)acrylate, ethylene glycol dimethacrylate, polyethylene glycol(600) diacrylate, N,N-methylenebisacrylamide and divinylbenzene.

The polymerization initiators used may be any well known photoinitiators, such as benzoins, benzil ketals, α-hydroxyketones, peroxides, azo compounds, azoxy compounds, diazosulfonates, diazosulfones, diazothioethers, diacyldiazomethanes, diaryl sulfides, hetero-aromatically substituted disulfides, diaroyl sulfides, tetrealkylthiuram disulfides, dithiocarbonates or dithiocarbamates. Individual examples are benzophenone, acetophenone, fluorenone, benzaldehyde, propiophenone, anthraquinone, carbazole, 3- or 4-methylacetophenone, 4,4'-dimethoxybenzophenone, allylacetophenone, 2,2'-diphenyoxyacetophenone, benzoin methyl ether, benzoin ethyl ether, benzoin propyl ether, benzoin acetate, benzoin phenylcarbamate, benzoin acrylate, benzoin phenyl ether, benzoyl peroxide, dicumyl peroxide, azobisisobutyronitrile, phenyl disulfide, acylphosphane oxides or chloromethylanthraquinone and combinations of these. Preferred photoinitiators which make particularly short irradiation times possible are benzoins, benzoin derivatives, benzil ketals and α-hydroxyketones For the purposes of this invention, the term "thermoinitiator" is taken to mean a compound which decomposes on heating, with formation of free radicals, which themselves initiate the graft polymerization. Examples of suitable classes of compound which may be used are the following: azo compounds, peroxides, hydroperoxides, peresters, persulfates, peroxycarbonates, ketone peroxides, disulfides and dibenzyl derivatives or combinations of these compounds. These thermoinitiators are well known, and many are commercially available.

A significant feature of the invention is that the polymer substrate is first pretreated with a photo-initiator or thermoinitiator and at least one monomer. The initiator is advantageously used here in an amount of from 0.01 to 40 percent by weight, preferably from 0.05 to 15 percent by weight, based on the monomer (amounts the same for both initiators). The selection of the initiator and of the monomer is guided, inter alia, by the solubility of these components in one another and the chemical nature of the polymer substrate. The monomer must be able to initiate swelling of the polymer substrate and thus allow the penetration of the initiator into the regions of the polymer substrate near to its surface. It is not important whether the monomer used for the pretreatment provides the desired surface-modifying properties, at least in the embodiment of the process in which a further monomer is applied after the pretreatment (variant B) and this is graftpolymerized onto the substrate surface together with the monomer used for the pretreatment. It is therefore quite feasible to pretreat with a monomer which is successful in initiating the swelling of the polymer substrate, in dissolving the initiator, and allowing it to penetrate, but which does not provide the modifying properties which are eventually desired, and in the grafting phase to work with a further monomer in which the relevant initiator is insoluble or not very soluble but which delivers the desired properties. The best combinations of substrate polymer, initiator and monomer for the pretreatment can be determined by exploratory experiments. For example, (meth)acrylic acid and/or its esters, in combination with azobisisobutyronitrile, is very suitable for the pretreatment of substrates made from polyamide, polyurethane, polyether block amide, polyester amide or polyester imide.

It is advantageous that the mixture for pretreating the polymer substrate consists essentially of at least the initiator and at least one monomer. The mixture may therefore consist exclusively of the abovementioned constituents or contain a defined amount, for example up to 80 percent by weight, based on the mixture, of a solvent. The solvent contained can advantageously be up to 50 percent by weight in the case of thermoinitiators and up to 40 percent by weight, in particular up to 20 percent by weight, in the case of photoinitiators. The concomitant use of a solvent is advantageous if the monomer and the initiator cannot or cannot easily be mixed to give a homogeneous mixture or solution, or if the substrate swells too severely when the monomer is used alone. In particular for subsequent modification of narrow-lumen cavities, it is of crucial importance that excessive swelling together with an increase in volume of the material to be modified and a reduction in the lumen is avoided. Examples of suitable solvents are water, acetone, methyl ethyl ketone, butanone, cyclohexanone, diethyl ether, tetrahydrofuran, dioxane, methanol, ethanol, propanol, butanol, cyclohexanol, dimethylacetamide, dimethyl sulfoxide, dimethylformamide, heptane, cyclohexane, benzene, toluene, dichloromethane, trichloromethane, ethyl acetate, propyl acetate, amyl acetate, acetonitrile or homogeneous mixtures of a plurality of these substances. The optimum type and amount of solvent can be determined without great difficulty for a certain task by preliminary experiments.

The treatment of the polymer substrate with the initiator and the monomer should take place in such a way that the surface of the polymer substrate swells slightly. The duration of the treatment is dependent on the respective combination of polymer substrate, initiator and monomer, and on the temperature. It need be only from 1 to 10 seconds, and is advantageously from 1 to 5 seconds. The best temperatures and treatment times can be determined without difficulty by exploratory experiments; typical procedures are given in the examples. The polymer substrate is preferably treated with a thermoinitiator and the at least one ethylenically unsaturated monomer at a temperature of from −20 to 200° C., particularly preferably at a temperature of from 0 to 80° C., and in particular at from 10 to 60° C. When a photoinitiator is used, the preferred treatment temperatures are from 10 to 200° C., particularly preferably from 20 to 80° C., and in particular from 30 to 60° C.

Solutions of or with the monomer and the initiator for treating the polymer substrate can be applied onto the polymer substrate by conventional coating methods, such as spraying, spreading or dipping.

In many cases, it is advantageous to remove monomer and initiator adhering to the surface of the pretreated substrate before the graft polymerization. This can be carried out, for example, by brief immersion (advantageously for from a few seconds up to about a minute) in a suitable solvent (as described above). Alternatively, the pretreated substrate can be rinsed with solvent. When adherent monomer and initiator have been removed in this or any other way, a highly extraction-resistant and homogeneous coating is obtained in the graft polymerization.

In variant B, the pretreatment is followed, if desired after removal of adherent monomer and initiator, by application of at least one further ethylenically unsaturated monomer to the substrate surface. This is necessary if the pretreatment has been or must be carried out using a monomer which does not per se impart the desired properties on the polymer substrate. For some applications, the greater layer thickness achieved in this way is also advantageous. The choice of further monomers applied after the pretreatment depends on the desired manner of modification of the surface of the polymer substrate. Thus, for example, hydroxyethyl (meth) acrylate, 4-hydroxybutyl (meth)acrylate or vinylated saccharides give hydrophilic surfaces.

The further monomers can likewise be applied to the polymer substrate by conventional coating methods, such as spraying, spreading or dipping. If the monomers are dissolved, for example in one of the solvents mentioned above, the solvent can be evaporated before or during the grafting.

The graft polymerization of the monomers is initiated by heating the substrate if a thermoinitiator is used and by irradiation if a photoinitiator is used. The polymer substrate can, as described, be merely pretreated (variant A) or additionally be provided with at least one further monomer (variant B). Instead of applying the further monomers, as mentioned, by conventional coating methods, the application of the monomers can also be combined with the grafting by immersing the pretreated substrate into a heated solution of the monomer. Suitable solvents are again the solvents which are suitable for the pretreatment. In general, solutions containing from 2 to 50 percent by weight of monomer are used. The pretreated polymer substrate is in contact with a liquid phase, namely the monomer or its solution. It can therefore be immersed or coated with the monomer or its solution.

If a photoinitiator is used, the graft polymerization of the monomers is generally initiated by electromagnetic radiation in the wavelength range from 180 to 1200 nm, preferably from 200 to 800 nm, and in particular from 200 to 400 nm. Radiation in this wavelength range is relatively soft and rarely attacks the polymer substrate. Use is made, for example, of an excimer UV emitter from Heraeus, D-63801 Neuostheim, with continuous radiation, for example using XeCl or XeF as emitter medium. In principle, mercury vapor lamps having a broad UV spectrum and radiation components in the visible region or in the abovementioned regions can also be used. The exposure times are generally from 60 to 300 seconds. The exposure times depend, inter alia, on the geometry of the irradiated substrates. Articles having a pronounced three-dimensional character must be rotated and require longer irradiation. Radiation-initiated graft polymerization advantageously proceeds in the temperature range from 0 to 100° C.

If a thermoinitiator is used, the graft polymerization is initiated by heating the pretreated polymer substrate, if desired provided with further monomer. The temperatures used depend on the decomposition rate of the thermoinitiator; they must in all cases be below the melting or softening point of the polymer substrate. The process is generally carried out at from 50 to 150° C. Both in variant A and in variant B with application with at least one further monomer by coating, the requisite temperature can be established in an elegant manner by radiative heating, for example by means of infra-red rays or microwaves. The requisite irradiation times can be determined without great difficulty by preliminary experiments; they are generally from 1 to 60 min.

After the graft polymerization, any residual monomers can be removed by extraction with a solvent. For example, hydrophilic monomers can be extracted with water. Furthermore, all or some of the functional groups that have been introduced can be converted into derivatives in a conventional manner. Thus, carboxyl groups can be neutralized to give carboxylate groups, carboxylic ester groups can be hydrolyzed to give hydroxyl, carboxyl or carboxylate groups, and carboxamide groups or nitrile groups can be hydrolyzed to give carboxyl groups. Further derivatizations of polymer substrates modified according to the invention can be undertaken by generally-applicable processes (H. Beyer, Lehrbuch der organischen Chemie [Textbook of Organic Chemistry], S. Hirzel Verlag, Stuttgart, 1988, p. 260 ff).

The present invention furthermore relates to the use of the polymer substrates modified in accordance with the invention for the production of medical products, and to the resultant medical products themselves. The products can consist of or comprise polymer substrates modified in accordance with the invention. Such products are preferably based on polyamides, polyurethanes, polyether block amides, polyester amides or polyester imides, PVC, polysiloxanes, polymethacrylate or polyterephthalates which have surfaces modified preferably with monomers containing carboxyl or carboxylate groups, sulfonate groups, hydroxyl groups and/or amino groups, according to the invention. Examples of medical products of this type are in particular catheters, blood bags, drains, guide wires and operating instruments intraocular lenses and contact lenses.

The present invention also relates to a method of using the polymer substrates surface-modified according to the invention for producing hygiene products and the hygiene products themselves. The above listings of preferred materials for medical products apply correspondingly. Examples of such hygiene products are toothbrushes, toilet seats, combs and packaging materials. The term hygiene products includes also other objects which may come into contact with a large number of people, such as telephone handsets, stair rails, door handles and window catches, and grab straps and grab handles in public conveyances.

The following examples are intended to illustrate the invention but not to restrict its range of application.

EXAMPLE 1
Variant A/Thermally Initiated Grafting 2 g of azoisobutyronitrile are dissolved in 61 g of acrylic acid, 6 g of sodium styrenesulfonate and 31 g of water. This mixture is warmed to 40° C. A piece of nylon 12 film measuring 5×8 cm is immersed in the mixture for a period of 30 sec. The film is removed and placed in a chamber filled with protective gas (nitrogen or argon), and the IR radiation source having a radiating area of 0.2 $m^2$ is installed in the lid of the chamber at a distance of 20 cm from the pretreated film. The IR source, which has an adjustable output of up to 3 kW, is adjusted so that the substrate temperature reaches 100° C. for a period of 30 min. The film is then removed and washed in 500 ml of demineralized water at 60° C. for 2 h.

EXAMPLE 2
Variant A/Thermally Initiated Grafting 1.5 g of azoisobutyronitrile are dissolved in 62.5 g of acrylic acid, 6 g of sodium styrenesulfonate and 30 g of water. This mixture is warmed to 35° C. A piece of polyurethane film (TECOFLEX® from Thermedix GmbH, Heidelberg) measuring 5×8 cm is immersed in the mixture for a period of 5 sec. The film is removed and placed in a chamber filled with protective gas (nitrogen or argon), and the IR radiation source having a radiating area of 0.2 $m^2$ is installed in the lid of the chamber at a distance of 20 cm from the pretreated film. The IR source, which has an adjustable output of up to 3 kW, is adjusted so that the substrate temperature reaches 90° C. for a period of 30 min. The film is then removed and washed in 500 ml of demineralized water at 60° C. for 2 h.

EXAMPLE 3
Variant A/Thermally Initiated Grafting 1.5 g of azoisobutyronitrile are dissolved in 62.5 g of acrylic acid, 6 g of sodium styrenesulfonate and 30 g of water. This mixture is warmed to 35° C. A commercially available catheter made from polyurethane (TECOFLEX® from Thermedix GmbH, Heidelberg) is immersed in the mixture for a period of 5 sec. In order to keep the interior of the catheter free, a continuous stream of protective gas (nitrogen or argon) is passed through the catheter during this time. When the pretreatment is complete, the catheter is removed and placed for 30 min. in a special apparatus containing a thermostated nitrogen atmosphere at 80° C. The catheter is then removed and washed in 500 ml of demineralized water at 60° C. for 2 h.

EXAMPLE 4
Variant A/Thermally Initiated Grafting 1.5 g of azoisobutyronitrile are dissolved in 62.5 g of acrylic acid, 6 g of sodium styrenesulfonate and 30 g of water. This mixture is warmed to 35° C. A commercially available catheter made from polyurethane (TECOFLEX® from Thermedix GmbH, Heidelberg) is immersed in the mixture for a period of 5 sec. In order to keep the interior of the catheter free, a continuous stream of protective gas (nitrogen or argon) is passed through the catheter during this time. When the pretreatment is complete, the catheter is removed and immersed in demineralized water at 25° C. for 10 sec., during which protective gas continues to be passed through. Subsequently, the catheter is placed in a special apparatus containing a thermostated nitrogen atmosphere at 80° C. The catheter is then removed and washed in 1000 ml of demineralized water at 60° C. for 2 h.

EXAMPLE 5
Variant A/Thermally Initiated Grafting 0.5 g of azoisobutyronitrile is dissolved in 58 g of acrylic acid, 2 g of sodium styrene sulfonate and 39.5 g of water. This mixture is warmed to 35° C. and passed for 10 seconds (flow rate 0.2 ml/sec) through the lumen of a commercially available catheter made from polyurethane (TECOFLEX® from Thermedix GmbH, Heidelberg). The lumen is then blown free using nitrogen. After completion of the pretreatment, the catheter is suspended in a microwave oven whose interior has been filled with protective gas (nitrogen or argon). The grafting is carried out by irradiation with microwaves (2.45 GHz) for 5 minutes. The catheter is then removed, and the lumen is rinsed with demineralized water at 60° C. for 2 h.

EXAMPLE 6
Variant A/Thermally Initiated Grafting 0.5 g of azoisobutyronitrile is dissolved in 58 g of acrylic acid, 2 g of sodium styrene sulfonate and 39.5 g of water. This mixture is warmed to 35° C. and passed for 10 seconds (flow rate 0.2 ml/sec) through the lumen of a commercially available catheter made from polyurethane (TECOFLEX® from Thermedix GmbH, Heidelberg). Immediately thereafter, demineralized water at 25° C. is passed through the lumen of the catheter for 5 sec. The lumen is then blown free using nitrogen. After completion of the pretreatment, the catheter is suspended in a microwave oven whose interior has been filled with protective gas (nitrogen or argon). The grafting is carried out by irradiation with microwaves (2.45 GHz) for 5 minutes. The catheter is then removed, and the lumen is rinsed with demineralized water at 60° C. for 2 h.

EXAMPLE 7
Variant B/Radiation-initiated Grafting 40 g of 2,2'-dimethoxy-2-phenylacetophenone are dissolved in 60 g of acrylic acid. The mixture is then warmed to 60° C. A piece of nylon-12 film measuring 5×8 cm is then dipped into this mixture for the duration of 15 seconds. The film is then removed and, under argon as inert gas, placed into an irradiation chamber with quartz glass cover. The film is then covered, in a countercurrent of inert gas, with 20 ml of a mixture of 9 g of acrylic acid, 11 g of sodium styrenesulfonate and 80 g of demineralized water. The irradiation chamber is closed and placed at a distance of 10 cm under an Heraeus excimer irradiation unit with emission at wavelength 308 nm. The irradiation is begun and continues for 60 seconds. The film is then removed and washed 6 times for 3 hours in 300 ml of demineralized water at 50° C.

EXAMPLE 8
Variant B/Radiation-initiated Grafting 40 g of 2,2'-dimethoxy-2-phenylacetophenone are dissolved in 60 g of acrylic acid. The mixture is then warmed to 60° C. A piece of nylon-12 film measuring 5×8 cm is then dipped into this mixture for the duration of 15 seconds. The film is then removed, dried and, under inert gas, placed into an irradiation chamber with quartz glass cover. The film is then covered, in a countercurrent of inert gas, with 20 ml of a mixture of 50 g of tertbutylaminoethyl methacrylate and 50 g of n-hexane. The irradiation chamber is closed and placed at a distance of 10 cm under an Heraeus excimer irradiation unit with emission at wavelength 308 nm. The irradiation is begun and continues for 300 seconds. The film is then removed and washed 6 times for 3 hours in 300 ml of demineralized water at 50° C.

EXAMPLE 9
Variant B/Radiation-initiated Grafting 20 g of 2,2'-dimethoxy-2-phenylacetophenone are dissolved in a mixture of 30 g of acrylic acid and 16 g of demineralized water. The mixture is then warmed to 35° C. A piece of polyurethane film (Tecoflex®) measuring 5×8 cm is then dipped into this mixture for the duration of 15 seconds. The film is then removed and, under inert gas, placed into an irradiation chamber with quartz glass cover. The film is then covered, in a countercurrent of inert gas, with 20 ml of a mixture of 5.85 g of acrylic acid, 4.2 g of sodium styrenesulfonate and 90 g of demineralized water. The irradiation chamber is closed and placed at a distance of 10 cm under an Heraeus excimer irradiation unit with emission at wavelength 308 nm. The irradiation is begun and continues for 120 seconds. The film is then removed and washed 6 times for 3 hours in 300 ml of demineralized water at 50° C.

EXAMPLE 10
Variant B/Radiation-initiated Grafting 20 g of benzoin methyl ether are dissolved in a mixture of 20 g of acetone and 5 g tertbutyl aminoethyl methacrylate. The mixture is then warmed to 50° C. A piece of polyurethane film (Pellethane®) measuring 5×8 cm is then dipped into this mixture for the duration of 30 seconds. The film is then removed, dried and, under inert gas, placed into an irradiation chamber with quartz glass cover. The film is then covered, in a countercurrent of inert gas, with 20 ml of a mixture of 50 g of tertbutylaminoethyl methacrylate and 50 g of n-hexane. The irradiation chamber is closed and placed at a distance of 10 cm under an Heraeus excimer irradiation unit with emission at wavelength 308 nm. The irradiation is begun and continues for 300 seconds. The film is then removed and washed 6 times for 3 hours in 300 ml of demineralized water at 50° C.

EXAMPLE 11
Variant B/Radiation-initiated Grafting 40 g of 2,2'-dimethoxy-2-phenylacetophenone are dissolved in 60 g of acrylic acid. The mixture is then warmed to 60° C. A piece of nylon-12 film measuring 5×8 cm is then dipped into this mixture for the duration of 15 seconds. The film is then removed and, under inert gas, placed into an irradiation chamber with quartz glass cover. The film is then brush-coated using a brush which has previously been dipped in 20 ml of a mixture of 14 g of acrylic acid, 6 g of sodium styrenesulfonate and 80 g of demineralized water. The irradiation chamber is closed and placed at a distance of 10 cm under an Heraeus excimer irradiation unit with emission at wavelength 308 nm. The irradiation is begun and continues for 60 seconds. The film is then removed and washed 6 times for 3 hours in 300 ml of demineralized water at 50° C.

EXAMPLE 12
Variant B/radiation-initiated Grafting 40 g of 2,2'-dimethoxy-2-phenylacetophenone are dissolved in 60 g of acrylic acid. The mixture is then warmed to 60° C. A piece of nylon-12 film measuring 5×8 cm is then dipped into this mixture for the duration of 15 seconds. The film is then removed, sprayed with 5 ml of a mixture of 12 g of acrylic acid, 8 g of sodium styrenesulfonate and 80 g of demineralized water, and, under inert gas, placed into an irradiation chamber with quartz glass cover. The irradiation chamber is closed and placed at a distance of 10 cm under an Heraeus excimer irradiation unit with emission at wavelength 308 nm. The irradiation is begun and continues for 60 seconds. The film is then removed and washed 6 times for 3 hours in 300 ml of demineralized water at 50° C.

EXAMPLE 13
Variant B/radiation-initiated Grafting 5 g of 2,2-dimethoxy-2-phenylacetophenone are dissolved in 60 g of acrylic acid and 35 g of water. A commercially available catheter made from polyurethane (Tecoflex®) is dipped into the mixture, heated to 35° C., for the duration of 5 seconds. In order to keep the catheter lumen clear, a continuous stream of inert gas (nitrogen) is passed through the catheter during the dipping. After this pretreatment, the catheter is removed and suspended in the irradiation tube using a specific apparatus which makes it possible to rotate the catheter during the irradiation. A coating solution of 2.9 g of acrylic acid, 2.1 g of sodium styrenesulfonate and 95 g of water is charged into the apparatus; during this, inert gas is again passed through the catheter. The Heraeus excimer irradiation unit emitting UV light of wavelength 308 nm is 5 cm distant. The irradiation is begun and lasts for 240 seconds during which the catheter is rotated about its longitudinal axis 60 times per minute. The catheter is then removed and washed 3 times for 2 hours in demineralized water at 50° C.

EXAMPLE 14
Variant A/Radiation-initiated Grafting 40 g of 2,2'-dimethoxy-2-phenylacetophenone are dissolved in 60 g of acrylic acid. The mixture is then warmed to 60° C. A piece of nylon-12 film measuring 5×8 cm is dipped into this mixture for the duration of 15 seconds. The film is then removed and, under argon or nitrogen as protective gas, placed into an irradiation chamber with quartz glass cover. The irradiation chamber is closed and placed at a distance of 10 cm under an Heraeus excimer irradiation unit (nominal output 1000 watts) with emission at wavelength 308 nm. The irradiation is begun and the exposure continues for 40 seconds. The film is then removed and washed 6 times for 3 hours in 300 ml of demineralized water.

EXAMPLE 15
Variant A/Radiation-initiated Grafting
5 g of 2,2'-dimethoxy-2-phenylacetophenone are dissolved in 60 g of acrylic acid and 35 g of demineralized water. The mixture is then warmed to 35° C. A piece of polyurethane film (Tecoflex®) measuring 5×8 cm is dipped into this mixture for the duration of 5 seconds. The film is then removed and, under argon or nitrogen as protective gas, placed into an irradiation chamber with quartz glass cover. The irradiation chamber is closed and placed at a distance of 10 cm under an Heraeus excimer irradiation unit (nominal output 1000 watts) with emission at wavelength 308 nm. The irradiation is begun and the exposure continues for 60 seconds. The film is then removed and washed 6 times for 3 hours in 300 ml of demineralized water.

EXAMPLE 16
Variant A/Radiation-initiated Grafting
5 g of 2,2'-dimethoxy-2-phenylacetophenone are dissolved in a mixture of 60 g of acrylic acid and 35 g of demineralized water. The mixture is then warmed to 35° C. A polyurethane tube (Tecoflex®) having a length of 15 cm and a diameter of 0.4 cm is dipped into this mixture for the duration of 5 seconds. The tube is then removed and suspended in an irradiation tube flushed with argon or nitrogen by means of a special apparatus which makes it possible to rotate the tube during the irradiation. The Heraeus excimer irradiation unit (nominal output 1000 watts, 308 nm) is 3 cm distant. The irradiation is begun, and the irradiation time is 180 sec. The tube is then removed and washed three times for 2 hours in 1000 ml of demineralized water at 50° C.

EXAMPLE 17
Variant A/Radiation-initiated Grafting
5 g of 2,2'-dimethoxy-2-phenylacetophenone are dissolved in a mixture of 60 g of acrylic acid, 6 g of sodium styrenesulfonate and 29 g of water. This mixture is then warmed to 35° C. A commercially available catheter made from polyurethane (Tecoflex®) is dipped into this mixture for the duration of 5 sec. In order to keep the interior of the catheter free drag during the pretreatment, a continuous stream of protective gas (nitrogen or argon) is passed through the catheter lumen. After completion of the pretreatment, the catheter is removed and suspended in an irradiation tube by means of a special apparatus which makes it possible to rotate the catheter during the irradiation. Protective gas continues to be passed through the catheter lumen. The Heraeus excimer irradiation unit (nominal output 1000 watts, 308 nm) is 3 cm distant. The irradiation is begun, and lasts for 180 seconds.

The catheter is then removed and washed three times for 2 hours in 1000 ml of demineralized water at 50° C.

Obviously, numerous modifications and variations of the present invention are possible in light of the above teachings. It is therefore to be understood that within the scope of the appended claims, the invention may be practiced otherwise than as specifically described herein.

The disclosures of German priority patent applications 197 15 449.2, filed Apr. 14, 1997; 197 32 586.6, filed Jul. 29, 1997; and 197 54 565.3, filed Dec. 9, 1997, are hereby incorporated by reference.

We claim:
1. A process for modifying the surface of a polymer substrate which comprises (1) pretreating the polymer substrate with a photoinitiator or thermoinitiator and at least one ethylenically unsaturated monomer, (2) removing monomers and initiator adhering to the surface of the pretreated substrate, (3) subjecting the resulting substrate to graft polymerization by said at least one monomer, optionally in the added presence of at least one ethylenically unsaturated monomer that is the same or different from the monomer of step (1).

2. The process as claimed in claim 1, wherein in step (3) only the monomer employed in step (1) is graft-polymerized.

3. The process as claimed in claim 1, wherein step (3) is carried out in the added presence of at least one ethylenically unsaturated monomer that is the same or different from the monomer of step (1).

4. The process as claimed in claim 1, wherein the polymer substrate is selected from the group consisting of a polyamide, polyurethane, polyether blocked amide, polyester amide, polyester imide, PVC, polysiloxane, polymethacrylate and polyterephthalate.

5. The process as claimed in claim 1, wherein the at least one monomer is an acrylic or methacrylic compound of the formula $$CH_2=CR^1-COOR^2 \qquad (I),\text{ or}$$

an acrylamide or methacrylamide of the formula $$CH_2=CR^1-CONR^2R^3 \qquad (II),\text{ or}$$

a vinyl compound of the formulae $$R^4CH=CHR^5 \qquad (III),\text{ or}$$

a derivative of maleic or fumaric acid of the formula $$R^4OOC-C=C-COOR^4 \qquad (IV),$$

wherein $R^1$ is a hydrogen atom or a methyl group; $R^2$, $R^3$ and $R^4$ are identical or different and are each a hydrogen atom, a metal atom or a branched or unbranched aliphatic, cycloaliphatic, heterocyclic or aromatic hydrocarbon radical having up to 20 carbon atoms or such a hydrocarbon radical containing carboxyl groups, carboxylate groups, sulfonate groups, alkylamino groups, alkoxy groups, halogens, hydroxyl groups, amino groups, dialkylamino groups, phosphate groups, phosphonate groups, sulfate groups, carboxamido groups, sulfonamido groups, phosphonamido groups or combinations of these groups; and $R^5$ is a hydrogen atom, a methyl group, a nitrile group, or a hydroxyl group, or is the same as $R^4$ or is an ether group of the formula $-OR^4$, in which $R^4$ is as defined above.

6. The process as claimed in claim 1, wherein the monomer contains at least one carboxyl group, sulfonate group, hydroxyl group, amino or ammonium group or phosphate group.

7. The process as claimed in claim 1, wherein the at least one ethylenically unsaturated monomer is a combination of at least one monoethylenically unsaturated monomer and at least one monomer which has two olefinic double bonds and has the formula

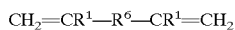

$$CH_2=CR^1-R^6-CR^1=CH_2$$

where $R^6$ is a bivalent organic radical and $R^1$ is a hydrogen atom or a methyl group, and wherein a crosslinked graft copolymer is formed.

8. The process as claimed in claim 1, wherein step (1) is carried out with a mixture consisting essentially of the photoinitiator or the thermoinitiator and the at least one ethylenically unsaturated monomer.

9. The process as claimed in claim 8, wherein the mixture comprises up to 80 percent by weight, based on the mixture, of an inert solvent.

10. The process as claimed in claim 1, wherein the photoinitiator is a benzoin, a benzoin derivative, a benzil ketal or an α-hydroxyketone.

11. The process as claimed in claim 1, wherein the thermoinitiator is an azo compound or a peroxo compound.

12. The process as claimed in claim 3, wherein step (3) is carried out in the presence of said added at least one ethylenically unsaturated monomer which is liquid or present in a solution.

13. The process as claimed in claim 12, wherein step (2) is carried out by dipping the pretreated polymer substrate into the liquid monomer or a solution of the liquid monomer.

14. The process as claimed in claim 12, wherein step (3) is carried out by coating the pretreated polymer substrate with the liquid monomer or with a solution of the liquid monomer.

15. The process as claimed in claim 1, wherein the photoinitiator is present, and electromagnetic radiation of wavelength of from 200 to 400 nm is applied.

16. The process as claimed in claim 1, wherein step (3) is carried out at a temperature of from 50 to 150° C.

17. The process as claimed in claim 16, wherein step (3) is carried out by infrared or microwave radiation.

18. A product obtained by the process of claim 1.

19. The process as claimed in claim 1, wherein step (2) is carried out by immersion in a solvent or rinsing with a solvent.

* * * * *